US011135922B2

(12) United States Patent
Kawazu et al.

(10) Patent No.: US 11,135,922 B2
(45) Date of Patent: Oct. 5, 2021

(54) CONTROL APPARATUS FOR ROTARY ELECTRIC MACHINE

(71) Applicant: DENSO CORPORATION, Kariya (JP)

(72) Inventors: Shinsuke Kawazu, Kariya (JP); Akira Kato, Kariya (JP); Takashi Senda, Kariya (JP)

(73) Assignee: DENSO CORPORATION, Kariya (JP)

( * ) Notice: Subject to any disclaimer, the term of this patent is extended or adjusted under 35 U.S.C. 154(b) by 268 days.

(21) Appl. No.: 16/095,395

(22) PCT Filed: Apr. 20, 2017

(86) PCT No.: PCT/JP2017/015935
§ 371 (c)(1),
(2) Date: Oct. 22, 2018

(87) PCT Pub. No.: WO2017/183698
PCT Pub. Date: Oct. 26, 2017

(65) Prior Publication Data
US 2019/0135114 A1    May 9, 2019

(30) Foreign Application Priority Data
Apr. 21, 2016 (JP) .............................. JP2016-085380

(51) Int. Cl.
*H02P 29/00* (2016.01)
*B60L 7/12* (2006.01)
(Continued)

(52) U.S. Cl.
CPC ........ *B60L 7/12* (2013.01); *B60L 7/10* (2013.01); *B60L 7/18* (2013.01); *B60W 10/08* (2013.01);
(Continued)

(58) Field of Classification Search
None
See application file for complete search history.

(56) References Cited

U.S. PATENT DOCUMENTS

2002/0057582 A1* 5/2002 Nakayama ............... B60L 3/04
363/17
2009/0292449 A1* 11/2009 Yamazaki ............. B60W 10/06
701/103
(Continued)

FOREIGN PATENT DOCUMENTS

CN        101162849 A       4/2008
CN        202906823 U       4/2013
(Continued)

OTHER PUBLICATIONS

Jul. 18, 2017 International Search Report issued in International Patent Application No. PCT/JP2017/015935.

*Primary Examiner* — Jonathan M Dager
(74) *Attorney, Agent, or Firm* — Oliff PLC (57) ABSTRACT

A system includes a rotary electric machine, wiring, a battery that is connected to the rotary electric machine by the wiring, and an upper limit value setting section which sets an output upper limit value that is an upper limit of an output command for the rotary electric machine. A control apparatus which controls the rotary electric machine is provided with a temperature acquisition section which acquires the temperature of at least one of the battery and the wiring, an allowable output value calculation section which calculates an allowable output value that is the upper limit allowed for the output command of the rotary electric machine, based on the temperature that is acquired by the temperature acquisition section, and a transmitting section which transmits the allowable output value calculated by the allowable value calculation section to the upper limit value setting section.

10 Claims, 8 Drawing Sheets

(51) Int. Cl.
  *H02P 9/04* (2006.01)
  *H02P 29/68* (2016.01)
  *B60L 7/10* (2006.01)
  *H02P 9/00* (2006.01)
  *B60L 7/18* (2006.01)
  *B60W 10/08* (2006.01)

(52) U.S. Cl.
  CPC ............... *H02P 9/00* (2013.01); *H02P 9/04* (2013.01); *H02P 29/68* (2016.02); *Y02T 10/64* (2013.01); *Y02T 10/72* (2013.01)

(56) References Cited

U.S. PATENT DOCUMENTS

| | | | | |
|---|---|---|---|---|
| 2010/0185405 | A1* | 7/2010 | Aoshima | B60L 58/22 702/63 |
| 2010/0194355 | A1 | 8/2010 | Wada et al. | |
| 2010/0327584 | A1 | 12/2010 | Fortmann | |
| 2012/0041629 | A1* | 2/2012 | Yamada | B60W 20/11 701/22 |
| 2012/0170164 | A1* | 7/2012 | Shimizu | H05K 1/0263 361/63 |
| 2013/0271093 | A1 | 10/2013 | Komurasaki et al. | |
| 2013/0320747 | A1* | 12/2013 | Ozaki | B60L 15/025 301/6.5 |
| 2014/0141301 | A1* | 5/2014 | Aoki | H01M 10/482 429/90 |
| 2014/0287278 | A1* | 9/2014 | Despesse | H01M 10/0445 429/7 |
| 2014/0330471 | A1* | 11/2014 | Ozaki | H02P 29/02 701/22 |
| 2015/0116883 | A1* | 4/2015 | Kimoto | G01K 13/00 361/103 |
| 2017/0203670 | A1* | 7/2017 | Morinaga | H02K 11/25 |
| 2017/0214256 | A1* | 7/2017 | Hardy | B60L 58/22 |
| 2017/0373287 | A1* | 12/2017 | Yamashita | H01M 50/35 |
| 2018/0034259 | A1* | 2/2018 | Sugisawa | B60R 16/02 |
| 2019/0131893 | A1* | 5/2019 | Kawazu | H02P 29/62 |
| 2019/0140225 | A1* | 5/2019 | Inoue | H01M 10/486 |

FOREIGN PATENT DOCUMENTS

| | | |
|---|---|---|
| JP | H08-182185 A | 7/1996 |
| JP | 2009-33895 A | 2/2009 |
| JP | 2011-91960 A | 5/2011 |
| JP | 4849421 B2 | 1/2012 |
| JP | 2012-100435 A | 5/2012 |
| JP | 2013-099177 A | 5/2013 |
| JP | 2013-187983 A | 9/2013 |

\* cited by examiner

CONTROL APPARATUS FOR ROTARY ELECTRIC MACHINE

CROSS-REFERENCE TO RELATED APPLICATION

This application is based on and incorporates herein by reference Japanese Patent First Application No. 2016-085380 filed on Apr. 21, 2016.

FIELD OF THE INVENTION

The present disclosure relates to a control apparatus for controlling a rotary electric machine.

DESCRIPTION OF RELATED ART

In the prior art, concerning a rotary electric machine having a polyphase winding and field winding, with an AC output current from the polyphase winding being rectified by a plurality of rectifier elements or switching elements, the energization interval of the field winding of the rotor is changed in each of respective fixed periods. The proportion of the energization interval is referred to as the duty ratio for the field winding, and the duty ratio is set variably in accordance with amount of electric power, etc., required from the rotary electric machine.

A control apparatus for a rotary machine is described in PTL 1 for use in varying the duty ratio of the field winding. With the control apparatus described in PTL 1, changeover can be performed between short-time rated operation in which the duty ratio is large, and continuous rated operation in which the duty ratio is small. In addition, a temperature sensor is provided close to a power transistor that controls the energizing of the field winding. If the temperature detected by the temperature sensor indicates an overheated condition, then short-time rated operation is inhibited.

CITATION LIST

Patent Literature

Japanese Patent Publication No. 2013-219965

BRIEF SUMMARY OF THE INVENTION

With the control apparatus described in PTL 1, in the case in which the temperature near the power transistor indicates an overheating condition, short-time rated operation is inhibited. However, in controlling a rotary electric machine, there are parts other than the power transistor or the rotary electric machine for which problems of temperature increase may occur. If the temperature increase is suppressed by making these parts large in scale and increasing the capability of each part, then it becomes difficult to reduce the apparatus size or lower the costs. On the other hand, if the output of the rotary electric machine is restricted, for preventing increase in temperature of these parts, then effectively, a limitation is placed upon controlling the rotary electric machine to produce a high output.

The present disclosure is intended to overcome the above problem, having a main objective of providing a control apparatus for a rotary machine which can effectively increase the output from the rotary electric machine without excessive increase in rating of respective parts of the apparatus.

The present disclosure provides the following means for overcoming the above problem.

A first means includes a control apparatus for controlling a rotary electric machine, with the control apparatus being applied to a system that includes the rotary electric machine, wiring, a battery that is connected to the rotary electric machine by the wiring, and an upper limit value setting section which sets an output upper limit value that is an upper limit of an output command for the rotary electric machine, and with the control apparatus comprising a temperature acquisition section which acquires the temperature of at least one of the battery and the wiring, an allowable output value calculation section which calculates an allowable output value that is the upper limit allowed for an output command of the rotary electric machine, with the calculation being based on the temperature that is acquired by the temperature acquisition section, and a transmitting section which transmits the allowable output value calculated by the allowable value calculation section to the upper limit value setting section. The temperature acquisition section acquires a temperature of the battery, and when the temperature acquired by the temperature acquisition section is lower than a prescribed temperature, the allowable value calculation section calculates a value for the allowable output value that is greater than a prescribed allowable value.

With the above configuration, the rotary electric machine and the battery are connected by the wiring, and the upper limit value setting section sets an output upper limit value, which is an upper limit of an output command for the rotary electric machine.

The temperature of at least one of the battery and the wiring is acquired by the temperature acquisition means. The allowable value calculation section then calculates an allowable output value that is the allowable upper limit of an output command for the rotary electric machine, with the calculation being based on the temperature that is acquired by the temperature acquisition section. Hence, the allowable output value of the rotary electric machine can be calculated taking into consideration the temperature of at least one of the battery and the wiring. It should be noted that it would be equally possible to use the generated electric power, the drive electric power, the generated current, the drive current, the drive torque, the control torque, etc., as the allowable output value for the rotary electric machine. The allowable output values of these correspond to an allowable value of input and allowable value of output of the battery, and correspond to an allowable value of energization of the wiring.

The allowable output value calculated by the allowable value calculation section is then transmitted by the transmitting section to the upper limit value setting section. Hence the upper limit value setting section can set the output upper limit value for the rotary electric machine by using an allowable output value which takes into consideration the temperature of at least one of the rotary electric machine and the wiring. It thus becomes possible to set the allowable output value such as to increase the output from the rotary electric machine, while also preventing an excessive increase in temperature of the rotary electric machine or the wiring. As a result, the effective output from the rotary electric machine can be increased, without requiring an excessively high rating for the battery or the wiring.

If the temperature of the battery is lower than a prescribed value, there is a danger that the battery may not have a sufficient capability. In that respect, with the above configuration, when the temperature of the battery is lower than the prescribed value, the allowable output value is calculated such as to be greater than a prescribed allowable value. Hence, the electric power that is inputted and outputted between the rotary electric machine and the battery can be increased, and a rise in temperature of the battery can be promoted. Thus, the performance of the battery can soon be secured.

With a second means, the allowable value setting section calculates the allowable output value for the rotary electric machine based further upon a duration for which electrical power is inputted and outputted between the rotary electric machine and the battery.

The longer the duration for which electric power is inputted and outputted between the rotary electric machine and the battery, the higher will become the temperature of the battery and of the wiring. In that respect, with the above configuration, the allowable output value for the rotary electric machine is calculated based further upon the duration for which the inputting and outputting of electric power between the rotary electric machine and the battery is continued. Hence the allowable output value of the rotary electric machine can be more appropriately calculated.

With a third means, the temperature acquisition section is provided with a current acquisition section which acquires a current flowing in the wiring, and a temperature estimation section which estimates the temperature of the wiring based on the current that is acquired by the current acquisition section and on the resistance of the wiring.

With the above configuration, the current that flows in the wiring is acquired by the current acquisition section, and the temperature of the wiring is estimated based on the acquired current and the resistance of the wiring. Hence, a sensor for detecting the temperature of the wiring can be omitted.

With a fourth means, the temperature estimation section comprises a voltage drop acquisition section which acquires a voltage drop of the wiring, and the temperature estimation section calculates the resistance of the wiring based on the current that is acquired by the current acquisition section and on the voltage drop that is acquired by the voltage drop acquisition section.

With the above configuration, the resistance of the wiring is calculated based on the current flowing in the wiring and on a voltage drop of the wiring. Hence, the resistance of the wiring can be accurately calculated, and the temperature of the wiring can be accurately estimated. Consequently, the output limit value of the rotary electric machine can be appropriately set.

With a fifth means, the allowable value calculation section predicts a future temperature value of the temperature of the wiring that will be acquired by the temperature acquisition section, and corrects the allowable output value based on the predicted future value.

With the above configuration, a future value of the temperature that will be acquired by the temperature acquisition section is predicted by the allowable value calculation section. Since the allowable output value is then corrected based on the future value of temperature, the allowable output value can be appropriately calculated, taking into consideration the future value of temperature.

With a sixth means, the allowable value calculation section corrects a parameter that predicts the future temperature value, with the correction being based on the predicted future value and on the temperature value that is acquired by the temperature acquisition section.

If the parameter that predicts the future value of temperature is not appropriate, there is a danger that the accuracy of predicting the future value will be lowered. In that respect, with the above configuration, the parameter that predicts the future value of temperature is corrected based on the predicted future value and on the temperature that is acquired by the temperature acquisition section. Hence if there is a deviation between the predicted future value and the actual temperature, the prediction accuracy can be increased by correcting the parameter that predicts the future value.

With a seventh means, the allowable value calculation section calculates the allowable output value such as to make the future temperature value become lower than a target temperature.

With the above configuration, the allowable output value is calculated such that the predicted future value of temperature will be lower than a target temperature. Hence if it is desired to maintain the temperature of an object lower than the target temperature, the allowable output value can be calculated such as to achieve that result.

With an eighth means, the allowable output value calculation section is provided with a deterioration condition acquisition section which acquires a condition of deterioration of an object for which the temperature is acquired, and corrects the allowable output value based on the condition of deterioration that is acquired by the deterioration condition acquisition section.

If the output of the rotary electric machine is increased when there is advanced deterioration of an object for which the temperature is acquired, then there is a danger that the deterioration will become further advanced. In that respect, with the above configuration, the allowable output value can be appropriately corrected by taking into consideration the condition of deterioration of object for which the temperature is acquired.

With a ninth means, the prescribed allowable value is a value that is set for causing the temperature of the battery to increase quickly.

With a tenth means, the allowable value calculation section calculates the efficiency of inputting and outputting electric power between the rotary electric machine and the battery after a prescribed time, and corrects the allowable output value such as to maximize that efficiency.

The efficiency of inputting and outputting electric power between the rotary electric machine and the battery varies in accordance with the conditions of the rotary electric machine and the battery. While electric power generation or driving is being performed continuously by the rotary electric machine, energy can be used more efficiently by making the efficiency reach a maximum after a prescribed time has elapsed, than by temporarily maximizing the output In that respect, with the above configuration, the efficiency that will be attained for inputting and outputting electric power between the rotary electric machine and the battery after a predetermined time has elapsed is calculated, and the allowable output value is corrected such as to maximize that efficiency. Hence, not only can the effective output from the rotary electric machine be increased, but also energy can be effectively utilized.

An eleventh means includes a control apparatus for controlling a rotary electric machine, with the control apparatus being applied to a system that includes the rotary electric machine, wiring, a battery that is connected to the rotary electric machine by the wiring, and an upper limit value setting section which sets an output upper limit value that is an upper limit of an output command for the rotary electric machine, and with the control apparatus comprising a temperature acquisition section which acquires the temperature of at least one of the battery and the wiring, an allowable output value calculation section which calculates, based on the temperature that is acquired by the temperature acquisition section, an allowable output value that is an upper limit allowed for the output command of the rotary electric machine, and a transmitting section which transmits the allowable output value calculated by the allowable value calculation section to the upper limit value setting section. The allowable value calculation section calculates the efficiency that will be attained for inputting and outputting electric power between the rotary electric machine and the battery after a prescribed time, and calculates the allowable output value such as to maximize the efficiency.

BRIEF DESCRIPTION OF THE DRAWINGS

The above and other objectives, features and advantages of the present disclosure will be made clearer from the following detailed description, referring to the appended drawings. The drawings are.

DETAILED DESCRIPTION OF THE INVENTION

First Embodiment

In the following, a first embodiment is described referring to the drawings, which is implemented as a control apparatus applied to an in-vehicle system that includes a rotary electric machine and a battery.

Figure 1:
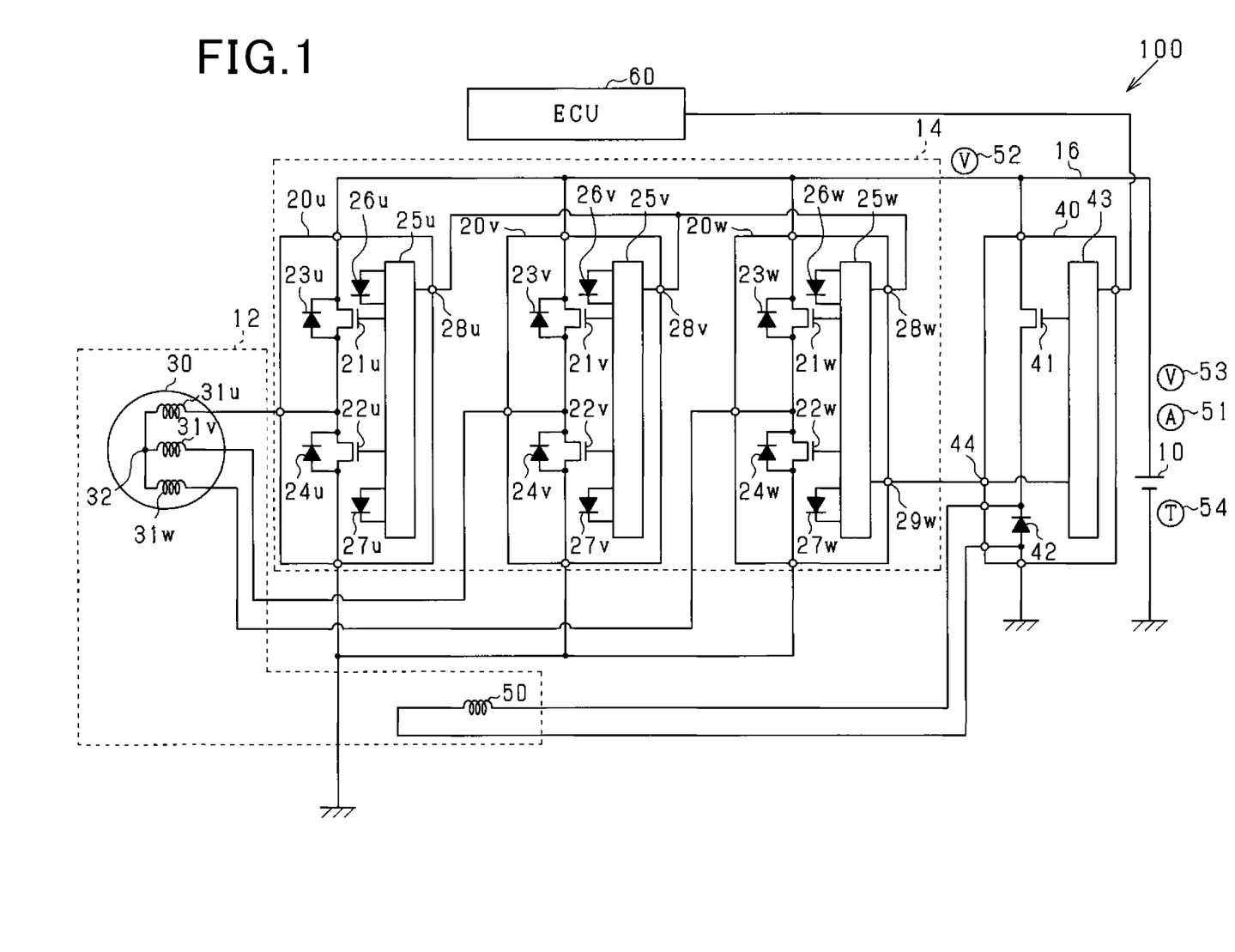
FIG. 1 is a general diagram of an in-vehicle system.

As shown in FIG. 1, in an in-vehicle system 100 (corresponding to a system), when a rotary electric machine 12 functions as an alternator (electric generator), the AC output current is rectified by an inverter 14 and electric power is supplied to a battery 10. On the other hand, when the rotary electric machine 12 functions as a motor (electric motor), electric power supplied from the battery 10 is converted to AC current. The battery is a lead-acid battery, having a terminal voltage of approximately 12 V, for example.

The inverter 14 is configured of a U-phase module 20u, a V-phase module 20v and a W-phase module 20w. These modules 20u, 20v, 20w of the inverter 14 are respectively connected to the U-phase winding 31u, V-phase winding 31v, and W-phase winding 31w that are wound on the stator 30 of the rotary electric machine 12.

The U-phase module 20u is equipped with a U-phase upper arm switching element 21u and a U-phase lower arm switching element 22u, which are MOSFETs. The source electrode of the U-phase upper arm switching element 21u and the drain electrode of the U-phase lower arm switching element 22u are connected, and a first end of the U-phase winding 31u is connected to the connection point of these. On the other hand, the second end of the U-phase winding 31u is connected to a neutral point 32. Furthermore, the drain electrode of the U-phase upper arm switching element 21u is connected to the positive terminal of the battery 10, while the source electrode of the U-phase upper arm switching element 21u is connected to ground. A U-phase upper arm diode 23u and a U-phase lower arm diode 24u are respectively connected in parallel with the U-phase upper arm switching element 21u and the U-phase lower arm switching element 22u, in opposing directions. Opening and closing of the U-phase upper arm switching element 21u and the U-phase lower arm switching element 22u are controlled by the U-phase drive circuit 25u.

The U-phase module 20u is further equipped with a U-phase upper arm temperature sensing diode 26u and a U-phase lower arm temperature sensing diode 27u. The U-phase upper arm temperature sensing diode 26u is mounted close to the U-phase upper arm switching element 21u, and can detect changes in temperature caused by heating of the U-phase upper arm switching element 21u. Similarly, the U-phase lower arm temperature sensing diode 27u is installed close to the U-phase lower arm switching element 22u, to detect changes in temperature caused by heating of the U-phase lower arm switching element 22u. The output values from the U-phase upper arm temperature sensing diode 26u and the U-phase lower arm temperature sensing diode 27u are inputted to the U-phase drive circuit 25u.

The configurations of the V-phase module 20v and the W-phase module 20w are the same as for the U-phase module 20u, and the manner of connection of the V-phase module 31v and the W-phase module 31w are the same as for the U-phase module 20u, so that description is omitted. Essentially, the rotary electric machine 12 and the battery 10 are connected by the wiring harness 16 (corresponding to wiring). A current sensor 51 (corresponding to a current acquisition section) is connected to the wiring harness 16, for detecting the current I that flows in the wiring harness 16 (rotary electric machine 12, battery 10). Furthermore, the wiring harness 16 is connected to a voltage sensor 52 that detects the voltage at the input/output terminals of the inverter 14, and is connected to a voltage sensor 53 that detects the voltage at the input terminal of the battery 10. The voltage sensor 52 and the voltage sensor 53 constitute a voltage drop acquisition section, which acquires the voltage drop ΔV in the wiring harness 16. A temperature sensor 54 which detects the temperature of the battery 10 is attached to the battery 10.

The U-phase module 20u is equipped with a U-phase connecting terminal 28u, for communicating with the V-phase module 20v and the W-phase module 20w. Similarly, the V-phase module 20v and the W-phase module 20w are provided respectively with a V-phase connecting terminal 28v and a W-phase connecting terminal 28w. The U-phase drive circuit 25u, the V-phase drive circuit 25v and the W-phase drive circuit 25w are respectively connected for communication via the U-phase connecting terminal 28u, V-phase connecting terminal 28v, and W-phase connecting terminal 28w. Furthermore, a regulator connecting terminal 29w is provided on the W-phase module 20w, and the W-phase drive circuit 25w is connected for enabling communication with the regulator 40 via this regulator connecting terminal 29w.

The regulator 40 is configured of a field switching element 41, a diode 42 and a control section 43. The regulator 40 controls the state of energization of the field winding 50 of the rotor. The field switching element 41 is for example a power MOSFET having the drain electrode connected to the positive terminal of the battery 10 and having the source electrode connected to the cathode of the diode 42. The anode of the diode 42 is connected to ground. The connection point of the field switching element 41 and the diode 42 is connected to one end of the field winding 50, and the other end of the field winding 50 is connected to ground. The open and closed state of the field switching element 41 is controlled by the control section 43 (corresponding to a rotary electric machine control section). Specifically, the control section 43 varies the duty ratio that expresses the proportion of energization interval in one control period (fixed period).

The control section 43 is connected via the module connecting terminal 44 to the regulator connecting terminal 29w of the W-phase module 20w, and communicates with the W-phase drive circuit 25w. The control section 43 transmits drive commands of the switching elements 21u, 22u, 21v, 22v, 21w, 22w to the W-phase drive circuit 25w. Specifically, the control section 43 designates, for each of the switching elements 21u, 22u, 21v, 22v, 21w, 22w of the respective phase windings to which current is inputted, those for which the upper arm or the lower arm is to be set ON. The W-phase drive circuit 25w drives the W-phase upper arm switching element 21w and the W-phase lower arm switching element 22w based on the drive commands. Furthermore, the drive commands are transmitted to the U-phase module 20u and to the V-phase module 20v. It should be noted that it would be equally possible for the judgement as to which of the upper arm switching elements 21u, 21v, 21w and lower arm switching elements 22u, 22v, 22w is to be set ON to be executed by the drive circuits 25u, 25v, 25w of the respective phases.

In addition, the W-phase drive circuit 25w obtains detection values from each of the temperature sensing diodes 26u, 27u, 26v, 27v, 26w, 27w and outputs these detection values to the control section 43. The control section 43 transmits and receives signals to/from the ECU 60, which is a higher-level control section. The ECU 60 is an engine ECU that controls the engine of the vehicle, or a power manager ECU that performs overall control of electrical energy of the vehicle.

Next, the regeneration control that is executed by the in-vehicle system 100 will be described referring to the flow diagram of FIG. 2. This processing sequence is repetitively executed at fixed periods.

Firstly, based on the state of the vehicle and on the charging demand of the battery 10, the ECU 60 judges whether to request implementation of regeneration (step S11). If there is no request for regeneration (S11: NO) then the processing sequence is ended.

On the other hand, if there is a request for implementing regeneration (S11: YES), then the ECU 60 calculates an electric power generation command value based on a braking torque demand and on the charging demand of the battery 10, the condition of electrical load, etc. (S12)

Next, the control section 43 obtains the allowable input value for the battery 10 (S13). This processing of step S13 is the sequence executed by the control section 43 shown in the flow diagram of FIG. 3.

Figure 3:
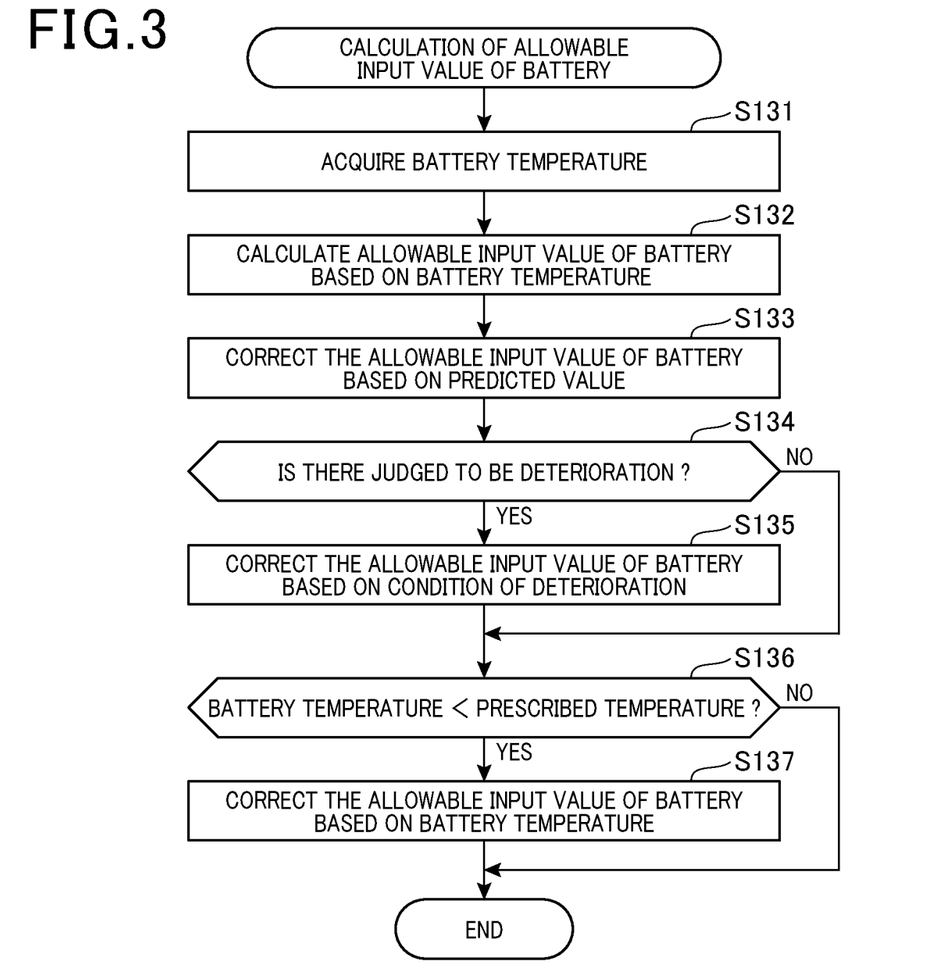
FIG. 3 is a flow diagram of a sequence for calculating an allowable input value for a battery.
Figure 4:
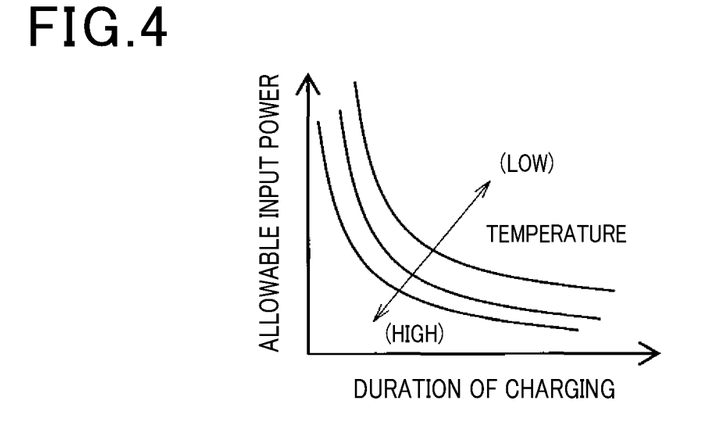
FIG. 4 is a map showing a relationship between a charging duration, battery temperature and allowable input power.

As shown in FIG. 3, firstly the temperature sensor 54 (corresponding to a temperature acquisition section) detects the temperature of the battery 10 (S131). Based on the detected temperature of the battery 10, the allowable input value for the battery 10 is calculated, which is the upper limit of allowable input to the battery 10 (S132). Specifically, as shown in the map of FIG. 4, the duration of charging the battery 10 under regeneration control, and the temperature of the battery 10, are inputted to the map of FIG. 4, to calculate the allowable input power for the battery 10 (base value of allowable input power) as an allowable input value. With the map of FIG. 4, the longer the duration of charging, the shorter becomes the allowable input power, and the higher the temperature of the battery 10 is, the lower becomes the allowable input power.

The allowable input power of the battery 10 is corrected based on prediction of the temperature of the battery (S133). Specifically, the current temperature of the battery 10, the environmental temperature around the battery 10 and the charging current of the battery 10, etc., are applied in a map or an equation, for predicting the future temperature of the 10. The allowable input value of the battery is then corrected based on that predicted value. For example, the higher the predicted future value, the smaller becomes the battery allowable input value, as a result of the correction.

If a parameter that predicts the future value of temperature is not appropriate, then there is a danger of lowering the accuracy of predicting the future value. For that reason, correction is applied to the parameter (map, coefficient of an equation, etc.) that predict the future value of temperature, with the correction being based on the predicted future temperature and the temperature that is detected by the temperature sensor 54. Specifically, if the predicted future temperature and the temperature that is detected thereafter deviate from one another, then the parameter is corrected such as to suppress the deviation.

Next, a judgement is made as to whether there is deterioration of the battery 10 (S134). Specifically, the decision to whether there is deterioration of the battery 10 is made using a known method of deterioration measurement that is based on the internal resistance of the battery 10 (S134). If it is judged that there is deterioration of the battery 10 S134: YES) then correction is applied to the allowable input value for the battery, based on the state of the deterioration (S135). For example, if there is advanced deterioration of the battery 10, then when the output power of the rotary electric machine 12 is increased there will be a danger that the deterioration will be further advanced. For that reason, the greater the degree of advancement of the deterioration of the battery 10, the smaller is made the allowable input value for the battery.

Next, a decision is made as to whether the temperature of the battery 10 is lower than a prescribed temperature (S136). For example, if the temperature of the battery 10 is lower than the prescribed temperature (0°, etc.) then there will be a danger that the battery 10 cannot provide sufficient capability. For that reason, if the temperature of the battery 10 that is detected by the temperature sensor 54 is lower than the prescribed temperature, then an allowable output value that is the upper limit value of allowable output from the battery 10 is calculated such as to be greater than a prescribed value of that allowable output. The prescribed allowable value could be calculated based on a map which defines relationships between the temperature of the battery 10 and correction values, or could be a fixed value that is predetermined such as to rapidly increase the temperature of the battery 10. This processing sequence is then temporarily ended (END). The processing of step S131 corresponds to processing executed as a temperature acquisition section, and the processing of step S134 corresponds to processing executed as a deterioration condition acquisition section.

Figure 5:
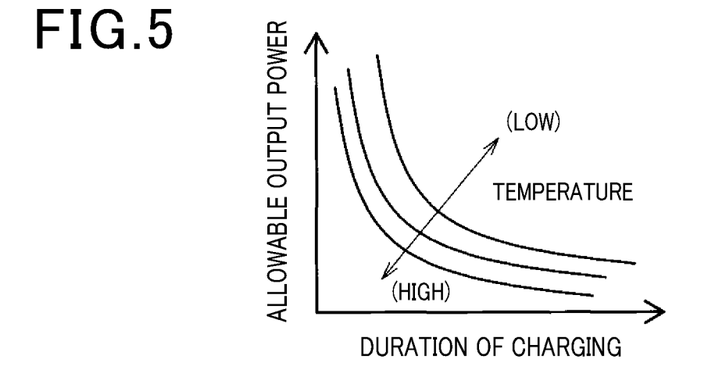
FIG. 5 is a map showing a relationship between power generation duration, rotary electric machine temperature, and allowable output power.

Returning to FIG. 2, the control section 43 obtains an allowable output value that is the limit value of allowable output from the rotary electric machine 12 (S14). Specifically, the duration of regeneration by the rotary electric machine 12 and the temperature of the rotary electric machine 12 are applied to the map shown in FIG. 5, to calculate the allowable output value for the rotary electric machine 12 as an allowable output power. With the map of FIG. 5, the smaller the duration of regeneration by the rotary electric machine, the lower becomes the allowable output power, and the higher the temperature of the rotary electric machine 12 the lower becomes the allowable output power. The detection values of the temperature sensing diodes 26*u*, 27*u*, 26*v*, 27*v*, 26*w*, 27*w* may be used as the temperature of the rotary electric machine 12, or it would be equally possible to detect the temperature of the stator 30, etc., Next, an allowable energization value is obtained, that is the upper limit value for input to the wiring harness 16 (S15). Specifically, the allowable energization value that is the upper limit value for input to the wiring harness 16 is obtained by applying the duration of energization of the wiring harness 16 and the temperature of the wiring harness 16 to a map, that is of the same form as those of FIGS. 4 and 5. It should be noted that if the wiring harness 16 incorporates a fuse, then it would be equally possible to take the capacity of the fuse into consideration in calculating the allowable energization value for the wiring harness 16.

Figure 6:
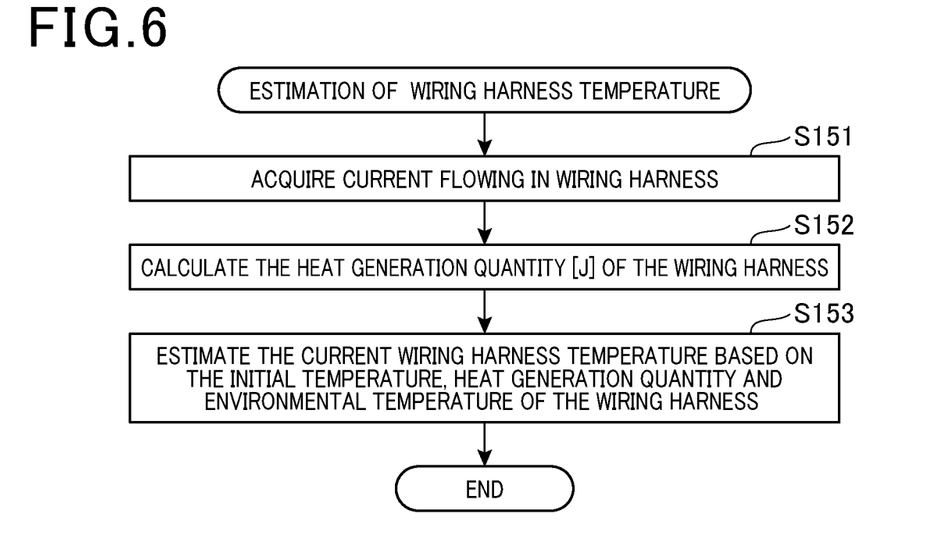
FIG. 6 is a flow diagram of a processing sequence for wiring harness temperature estimation.

The processing sequence for estimating the temperature of the wiring harness 16 will be described referring to the flow diagram of FIG. 6. This processing sequence is executed repetitively by the control section 43 at fixed periods.

Firstly, the current that is flowing in the wiring harness 16 is obtained (S151). Specifically, the current I flowing in the wiring harness 16 is detected by means of the current sensor 51, Next, based on the detected current I and the resistance R of the wiring harness 16, the heat generation quantity Q [J] of the wiring harness 16 is calculated (S152). Specifically, the heat generation quantity Q is calculated using the equation: Q=resistance R×current $I^2$×time t. The resistance R is calculated based on the current I flowing in the wiring harness 16 and the voltage drop $\Delta V$ in the wiring harness 16. That is to say, the resistance R is calculated using the equation: resistance R=voltage drop $\Delta V$/current I. The voltage drop $\Delta V$ is the difference between the voltage at an input/output terminal of the inverter 14 that is detected by the voltage sensor 52 and a voltage at an input/output terminal of the battery 10 that is detected by the voltage sensor 53.

Next, based on the initial temperature and heat generation quantity Q of the wiring harness 16, and on the environmental temperature, the current temperature of the wiring harness 16 is estimated (S153). The initial temperature is taken to be the environmental temperature around the wiring harness 16. Specifically, the temperature of the wiring harness 16 is estimated by using a known method of temperature estimation that is based on a heat conduction equation, etc. It should be noted that the accuracy of estimating the temperature of the wiring harness 16 could be enhanced by taking into consideration the effects of air currents that are caused by the vehicle travel, or are produced by fans, etc. The processing sequence is then ended. The processing of S13~S15 corresponds to processing executed as an allowable value calculation section, while the processing of S151~S153 corresponds to processing executed as a temperature estimation section (temperature acquisition section). Furthermore, it would be equally possible to detect the temperature of the wiring harness 16 by using a temperature sensor.

Returning to FIG. 2, the ECU 60 calculates the limit of the allowable value of electric power generation as the upper limit value of the power generation command, based on the respective allowable values for the battery 10, the control section 12 and the wiring harness 16. The respective allowable values for the battery 10, the control section 12 and the wiring harness 16 are transmitted by the control section 43 to the ECU 60. The transmitting processing corresponds to processing executed as a transmitting section. This processing S16 is executed by the ECU 60 in the sequence of the flow diagram of FIG. 7.

Figure 7:
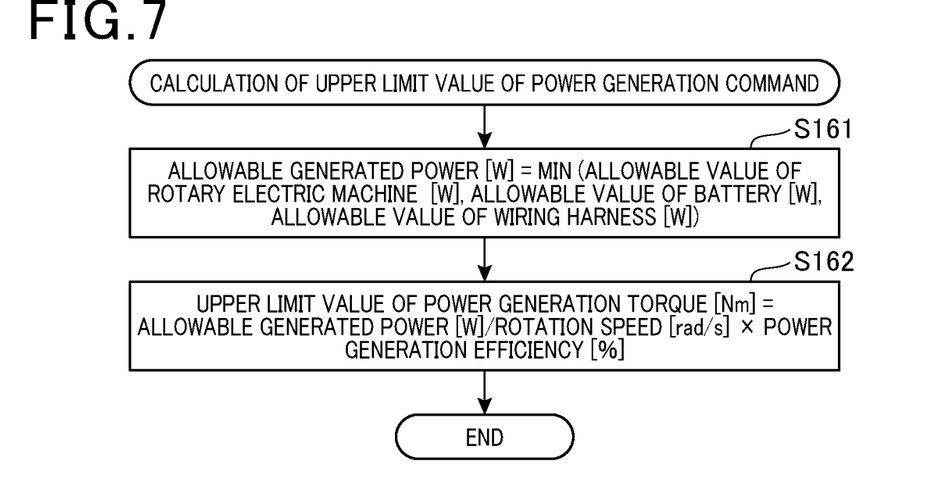
FIG. 7 is a flow diagram of a processing sequence for calculating an upper limit value of a power generation command with a first embodiment.

Firstly, the allowable generated power [W] is calculated based on the allowable output value [W] for the rotary electric machine 12, the allowable input value [W] for the battery 10, and the allowable energization value [W] for the wiring harness 16 (S161). Specifically, the smallest one of the allowable output value for the rotary electric machine 12, the allowable input value [W] for the battery 10 and the allowable energization value [W] for the wiring harness 16 becomes the allowable generated power [W] (corresponding to an output upper limit value). That is to say, the output upper limit value is set based on the allowable output values (allowable input values) that are received as a command receiving side, and with this embodiment, the output upper limit value is set as the lowest one of the respective allowable values (corresponding to allowable output values) for the objects whose temperatures are acquired.

Next, based on the calculated allowable generated power [W], the allowable value of power generation torque is calculated as the upper limit value of a power generation torque command (S162). Specifically, the upper limit value of power generation torque [Nm] is calculated using the equation: upper limit value of power generation torque [Nm]=allowable generated power [W]/rotation speed [rad/s]×power generation factor (%). The rotation speed [rad/s] is the rotation speed of the rotary electric machine 12. The power generation factor (%) is the rate at which the rotary electric machine 12 converts kinetic energy to electrical energy, when regeneration is being performed. It should be noted that this not limited to the above equation, and that it would be equally possible to use a map, etc., for converting the allowable generated power [W] to an upper limit value of power generation torque [Nm]. This processing sequence is then ended. The processing of step S16 corresponds to processing executed as an upper limit value setting section.

Returning to FIG. 2, the ECU 60 next restricts the power generation command value by a power generation command upper limit value (S17). Specifically, the smallest one of the power generation command value and the power generation command upper limit value is set as a new power generation command value. Next, the ECU 60 implements regeneration by the rotary electric machine 12, based on the power generation command value that has been set (S18). Specifically, the duty ratio that controls the state of energization of the field winding 50 is changed by the control section 43 such as to cause the rotary electric machine 12 to generate the command value of power. It should be noted that the power generation command value is not limited to being the power generation torque, and it would be equally possible to use the power generation voltage, the power generation current, the field current, the field duty ratio, etc. This processing sequence is then ended (END).

The embodiment described in detail above has the following advantages.

The temperatures of the battery 10, the rotary electric machine 12 and the wiring harness 16 are acquired. The allowable output value from the rotary electric machine 12 is then calculated for each of the objects whose temperature is acquired, with the calculation based on the acquired temperatures. For that reason, the allowable output value from the rotary electric machine 12 can be calculated taking into consideration the temperatures of the battery 10, the rotary electric machine 12 and the wiring harness 16.

The control section 43 transmits to the ECU 60 the allowable values that have been calculated for the respective objects. Hence the ECU 60 can set the output upper limit value (allowable generated power) for the rotary electric machine 12 based on the allowable output values for the battery 10, the rotary electric machine 12 and the wiring harness 16. Accordingly, it is made possible to prevent excessive temperature rise of the battery 10, the rotary electric machine 12 or the wiring harness 16, while also making it possible to set the output upper limit value such as to increase the output from the rotary electric machine 12.

The output upper limit value for the rotary electric machine 12 can be appropriately set as the optimum output upper limit value for the entire in-vehicle system 100, taking into consideration the allowable output values for the rotary electric machine 12, the battery 10 and the wiring harness 16. As a result, the effective output power from the rotary electric machine 12 can be increased without requiring excessively increased capabilities for the battery 10 and the wiring harness 16.

The allowable output value from the rotary electric machine 12 is calculated based on the duration of inputting and outputting electric power between the rotary electric machine 12 and the battery 10. As a result, the allowable output value for the rotary electric machine 12 can be more appropriately calculated.

The current flowing in the wiring harness 16 is acquired by means of the current sensor 51, and the temperature of the wiring harness 16 is estimated based on the acquired value of current and the resistance of the wiring harness 16. For that reason, it becomes possible to omit a temperature sensor for the wiring harness 16.

The resistance of the wiring harness 16 is calculated based on the current flowing in the wiring harness 16 and on an obtained voltage drop in the wiring harness 16. As a result, the resistance of the wiring harness 16 can be accurately calculated, and the temperature of the wiring harness 16 can be accurately calculated. In turn, the allowable output value for the rotary electric machine 12 can be calculated appropriately, and the output upper limit value from the rotary electric machine 12 can be appropriately set by using that allowable output value.

The current temperature of the battery 10, the environmental temperature of the surroundings of the battery 10 and the charging current of the battery 10, etc., are applied to a map or an equation, to predict the future temperature value of the battery 10. Since the allowable output value is corrected based on the predicted future temperature, the allowable output value can be more appropriately calculated, taking into consideration the future temperature value.

The parameter used for predicting the future value is corrected based on the predicted future temperature and the temperature value that is acquired by means of the temperature sensor 54. As a result, if there is a deviation between the predicted future value and the actual temperature value, the accuracy of predicting the future value can be increased by correcting the parameter used in that prediction.

The state of deterioration is obtained for an object (for example the battery 10) whose temperature is acquired. The allowable output value can then be appropriately corrected, taking into consideration the state of deterioration of the object whose temperature is acquired.

If the temperature of the battery 10 is lower than a prescribed temperature, then the allowable output value is calculated such as to be greater than a prescribed allowable value. The power that is inputted and outputted to/from the rotary electric machine 12 and the battery 10 can thereby be increased, and temperature increase of the battery 10 can be promoted. Hence, the capability of the battery 10 can soon be secured.

The lowest one of the respective allowable output values of the objects is set as the output upper limit value. Hence, excessive temperature increase can be prevented, for all of the objects.

The following modifications could be implemented for the above embodiment.

It would be equally possible for the control section 43 to calculate the allowable input value for the battery 10 such as to make the predicted future temperature value of the battery 10 become lower than a target temperature. With such a configuration, when it is required to maintain the temperature of the battery 10 below the target temperature, the allowable input value can be calculated such as to obtain that effect. It should be noted that this is not limited to the battery 10, and it would be equally possible to make the predicted future temperature value of some other object whose temperature is acquired become lower than a target value, by calculating the allowable output value for the object such as to achieve that effect.

The efficiency of inputting and outputting electric power between the rotary electric machine 12 and the battery 10 varies in accordance with the conditions of the rotary electric machine 12 and the battery 10. When regeneration is performed continuously by the rotary electric machine 12, kinetic energy can be more effectively utilized by operating at maximum efficiency after a certain time has elapsed, than by temporarily operating at maximum output. In that respect, it would be equally possible for the control section 43 to calculate the efficiency that will be attained for inputting and outputting electric power between the rotary electric machine 12 and the battery 10 after some time has elapsed, and to correct the allowable output value such as to maximize the efficiency. For example, the amount of temperature increase of the battery 10 when regeneration operation is performed for a prescribed duration could be predicted, and the allowable output value could be corrected such as to maximize the power conversion efficiency of the battery 10 after the prescribed duration has elapsed. With such a configuration, not only can the effective output power of the rotary electric machine 12 be increased, but energy can be effectively utilized. Furthermore, the allowable output value could be corrected such that the output from the battery 10 will reach a maximum after a prescribed interval has elapsed.

It would be equally possible to omit the processing for correcting the parameters which predict the future value based on the predicted future temperature and the temperature that is detected by the temperature sensor 54. It would also be possible to omit the processing of S133.

It would also be possible to omit the processing of S134 and S135. It would moreover be possible to omit the processing of S136 and S137.

It would also be possible for the ECU 60 to set, as the upper limit value of output, the allowable output value of the one of the objects whose acquired temperature is closest to an upper limit value of temperature of the objects. With such a configuration, excessive temperature increase can be suppressed, even for the object whose temperature is closest to the upper limit value of temperature of the objects.

It is not necessary for the charging duration or the power generation duration to be restricted to an actual continuation interval, and a predicted continuation interval could be used (duration prediction section). Furthermore, it would also be possible to calculate the allowable output values for the respective objects based on the temperature of each object, without taking into consideration the charging duration or the power generation duration.

With the above embodiment, the temperatures of the battery 10, the rotary electric machine 12 and the wiring harness 16 are acquired and an allowable output value from the rotary electric machine 12 is calculated based on these temperatures of the respective objects. However, it would be equally possible to acquire the temperature of at least one of the battery 10 and the wiring harness 16, and to calculate the allowable output value for the rotary electric machine 12 based on that temperature. Furthermore, it would also be possible to acquire the temperatures of at least two of the rotary electric machine 12, the battery 10 and the wiring harness 16, and to calculate the allowable output value for the rotary electric machine 12 based on these temperatures.

A predetermined fixed value could be used as the resistance R of the wiring harness 16.

The battery 10 is not limited to being a lead-acid battery and a lithium battery or the like could be utilized.

Figure 2:
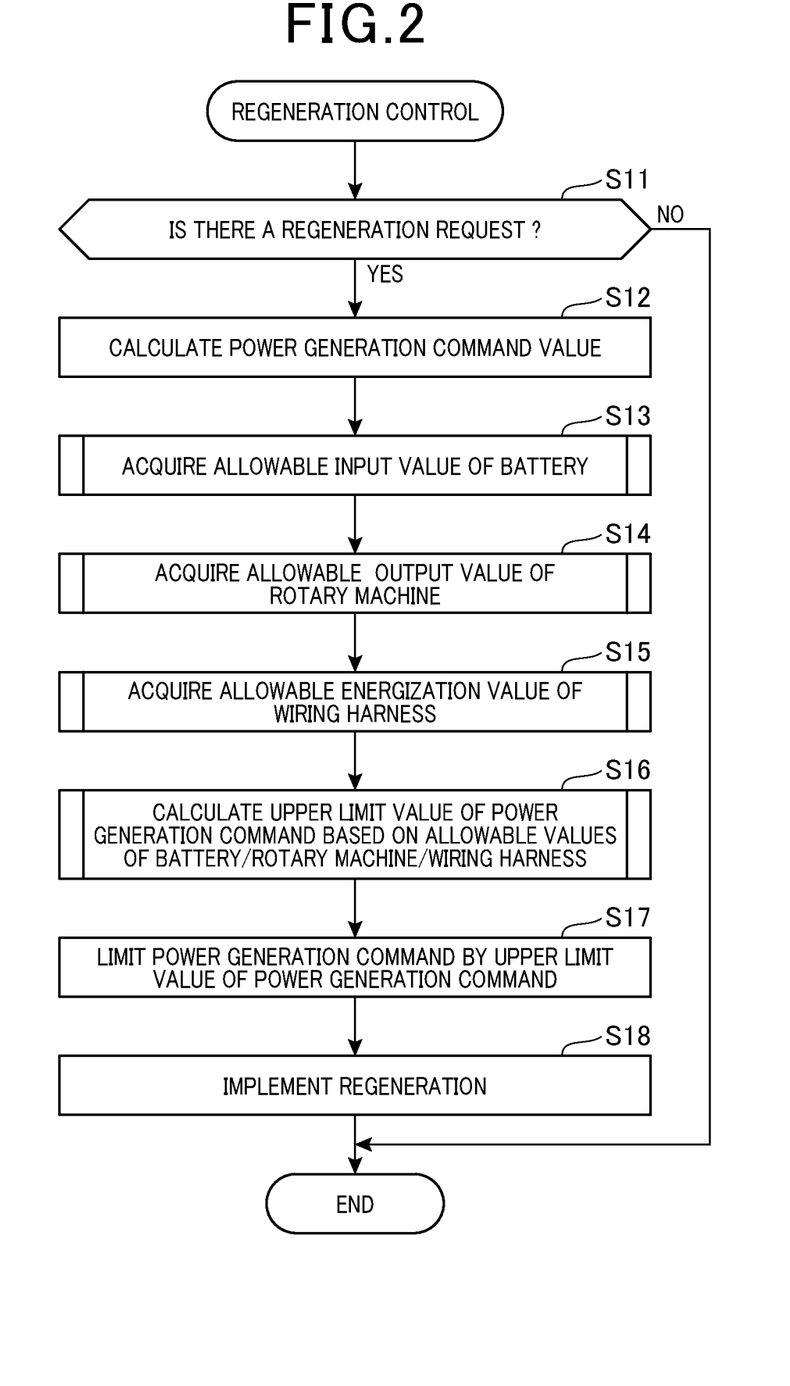
FIG. 2 is a flow diagram of a processing sequence of a rotary electric machine.

The upper limit value of the drive command, for drive control of the rotary electric machine 12, could be calculated instead of calculating the upper limit value of the power generation command as in FIG. 2, for regeneration control. In that case, processing based on the above embodiment could be executed whereby, together with changeover from power generation to drive, inputting and outputting between the battery 10 and the rotary electric machine 12 is reversed. Furthermore, an electric generator, an electric motor, an ISG (Integrated Starter Generator), or a MG (Motor Generator), etc., could be used as the rotary electric machine 12.

Second Embodiment

Figure 8:
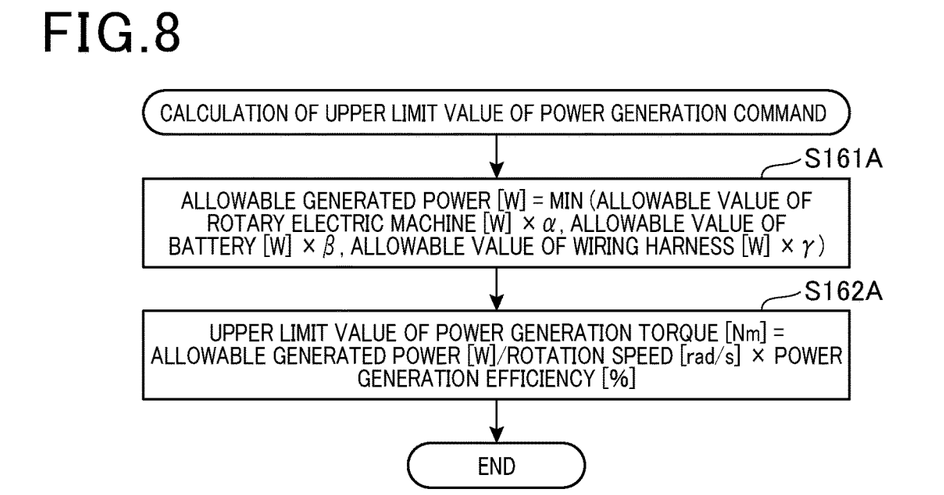
FIG. 8 is a flow diagram of a processing sequence for calculating an upper limit value of a power generation command with a second embodiment and a third embodiment.

A sequence for calculating the upper limit value of the power generation command with a second embodiment will be described referring to the flow diagram of FIG. 8, with the description being centered on points of difference from the first embodiment. This processing sequence is executed by the ECU 60, and is a modified form of the processing used for calculating the upper limit value of the power generation command shown in FIG. 7.

Firstly, the allowable output value [W] for the rotary electric machine 12, the allowable input value [W] for the battery 10 and the allowable energization value [W] for the wiring harness 16 are calculated (S161A). Here, weighting of the respective allowable values is performed, by multiplying the allowable values by coefficients $\alpha$, $\beta$, $\gamma$ respectively.

Specifically, the control section 43 predicts the future temperature values of the rotary electric machine 12, the battery 10 and the wiring harness 16. This corresponds to processing executed as a temperature predicted section. Next, based on the allowable output values and the future temperature values for the respective objects, the ECU 60 calculates the integrated value of electric power that continues to be inputted and outputted between of the rotary electric machine 12 and the battery 10 during a prescribed time, and sets the coefficients $\alpha$, $\beta$, $\gamma$ such as to maximize the integrated value. For example, in the case of the coefficient of an object for which an increase in temperature causes a large reduction in the allowable value, that coefficient could be set to a smaller value than the coefficient of an object for which only a small reduction in the allowable value is caused by a temperature increase. The smallest one of the allowable values that have been weighted in this way, can then be set as the allowable generated power [W] (corresponding to an output upper limit value).

Next, based on the allowable generated power [W] thus calculated, the upper limit value of power generation torque is calculated, as the upper limit value of the power generation command (S162A). The processing of S162A is the same as for S162. The processing sequence is then ended. It should be noted that the processing of S161A corresponds to processing executed as an upper limit value setting section.

With this embodiment, future values of temperature are predicted for each of the objects concerned. An integrated value of electric power that will be inputted and outputted between the rotary electric machine 12 and the battery 10 for a prescribed duration is then calculated, based on the predicted future temperature values of the respective objects, and the allowable output value is are set such as to maximize that integrated value. Hence when electric power is inputted and outputted between the rotary electric machine 12 and the battery 10 for the prescribed duration, maximum use can be made of the energy.

Third Embodiment

A sequence for calculating the upper limit value of the power generation command with a third embodiment will be described referring to the flow diagram of FIG. 8, with the description being centered on points of difference from the second embodiment.

With this embodiment, based on the allowable output values and future temperature values for each of the respective objects, the ECU 60 sets the coefficients $\alpha$, $\beta$, $\gamma$ such as to maximize the efficiency of inputting and outputting electric power between the rotary electric machine 12 and the battery 10 for a prescribed duration. For example, the coefficient of the object for which the efficiency is lowered to the greatest extent by a rise in temperature could be set at a smaller value than that of the coefficient of the object for which the efficiency is lowered to the smallest extent by a rise in temperature. The wiring harness 16 corresponds to the object for which the allowable value is lowered to the smallest extent by a rise in temperature. The smallest one of the allowable values that are weighted in this way is made the allowable generated power [W] (corresponding to the output upper limit value).

With this embodiment, predicted future temperature values are obtained for each of the objects concerned. The efficiency of inputting and outputting electric power between the rotary electric machine 12 and the battery 10 that will be attained after a prescribed time is then calculated, based on the allowable output value and on the future temperature values predicted for the respective objects, and the allowable output value is set such that the efficiency will reach a maximum. Hence, not only can the effective output from the rotary electric machine 12 be increased, but also energy can be efficiently utilized.

Fourth Embodiment

Figure 9:
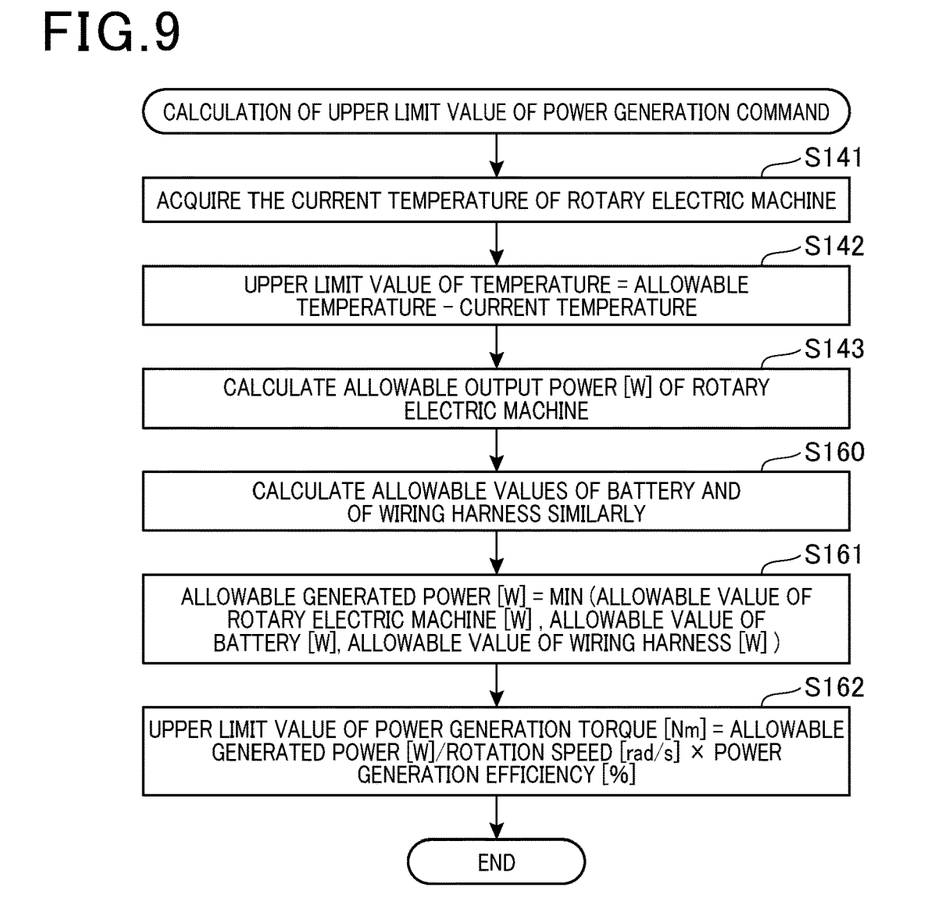
FIG. 9 is a flow diagram of a processing sequence for calculating an upper limit value of a power generation command with a fourth embodiment.

A sequence for calculating the upper limit value of the power generation command with a fourth embodiment will be described referring to the flow diagram of FIG. 9, with the description centered on points of difference from the first embodiment. This sequence is a modification of the processing of FIGS. 13 to 15 and the processing for calculating the upper limit value of the power generation command shown in FIG. 7. Processing steps that are identical to processing steps of the first embodiment are designated by the same step numerals as for the first embodiment, and description is omitted.

Figure 10:
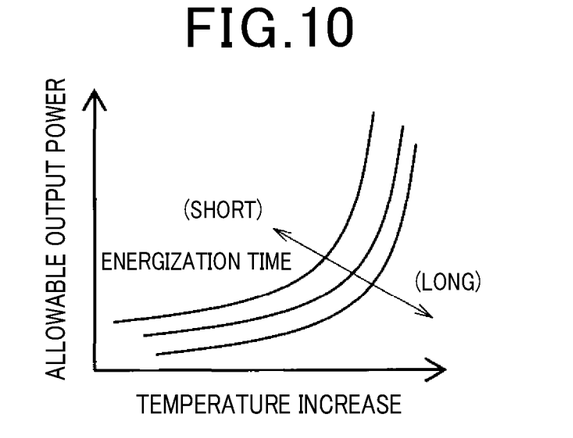
FIG. 10 is a map showing a relationship between temperature increase, charging duration, and allowable output power.

Firstly, the control section 43 acquires the current temperature of the rotary electric machine 12 (S141). The allowable temperature (target temperature) of the rotary electric machine 12 is subtracted from the current temperature, and a limit value of temperature increase is calculated (S142). Based the limit value of temperature increase, the energization time, and the relationship between these and allowable generated power, the allowable generated power [W] value of the rotary electric machine 12 is calculated (S143). Specifically, the limit value of temperature increase and the energization time are applied to the map shown in FIG. 10, for calculating the allowable generated power [W] as the allowable output value for the rotary electric machine 12, such that the temperature increase will not exceed the limit value of temperature increase. An estimated value of the energization time is used, estimated based on the vehicle speed, driver operations, etc. With the map of FIG. 10, the greater the value of allowable generated power [W], the greater becomes the temperature increase, and the longer the energization time, the greater becomes the temperature increase.

Next the allowable output values [W] are calculated for the battery 10 and the wiring harness 16 by the processing of (S160) S161, S162, which is the same as for FIG. 7. The processing of S141~S160 corresponds to processing executed as an allowable value calculation output section.

With this embodiment, an upper limit value of output power is set based on the allowable output values and the future temperature values of the respective objects such that, when inputting and outputting of electric power between the rotary electric machine 12 and the battery 10 is continued for a prescribed duration, the respective future temperature values of the objects will be lower than the allowable temperature values of the objects. Hence, when it is required to maintain the temperature of each of the objects lower than the allowable temperature value for the object, the allowable output value is calculated such as to achieve that result.

Fifth Embodiment

Figure 11:
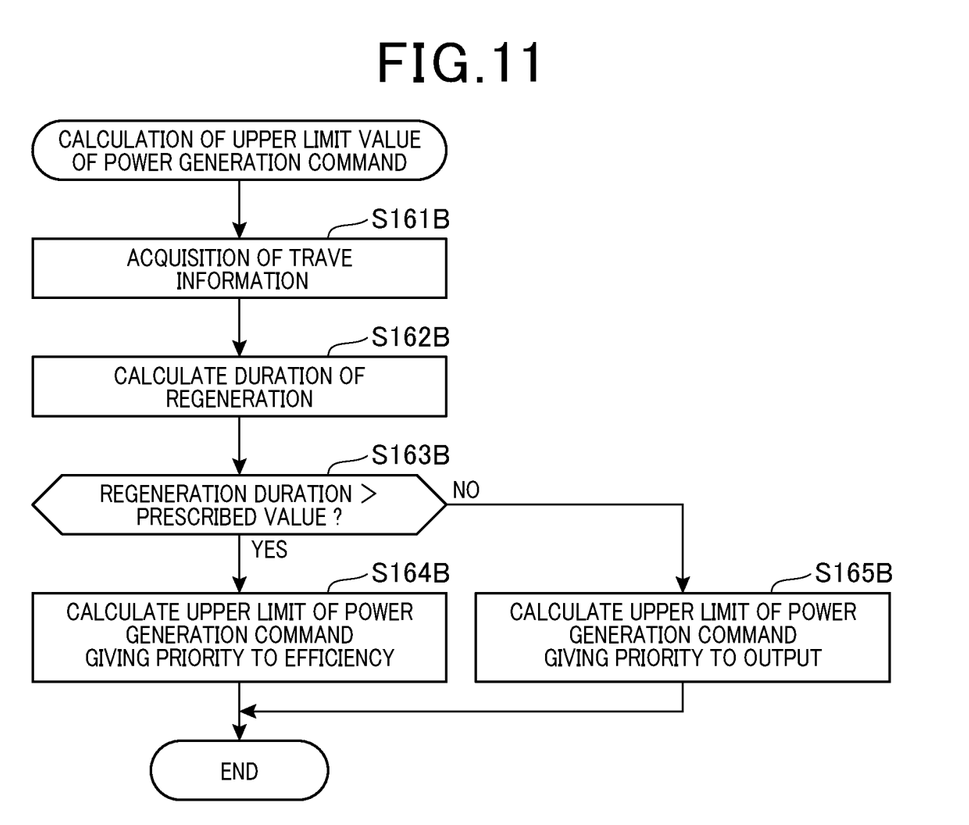
FIG. 11 is a flow diagram of a processing sequence for calculating an upper limit value of a power generation command with a fifth embodiment.

A sequence for calculating the upper limit value of the power generation command with a fifth embodiment will be described referring to the flow diagram of FIG. 11, with the description centered on points of difference from the second embodiment. A point of difference is that in S161A of the processing shown in FIG. 8 for calculating the upper limit value of the power generation command, the calculation method uses the coefficients α, β, γ with that processing sequence being executed by the ECU 60.

Firstly, travel information for the vehicle is acquired (S161B). The vehicle speed and the slope of the road on which the vehicle is traveling are acquired, as the travel information. The slope may be obtained as a detection value from a slope sensor, or obtained as information from a vehicle navigation apparatus, etc.

Figure 12:
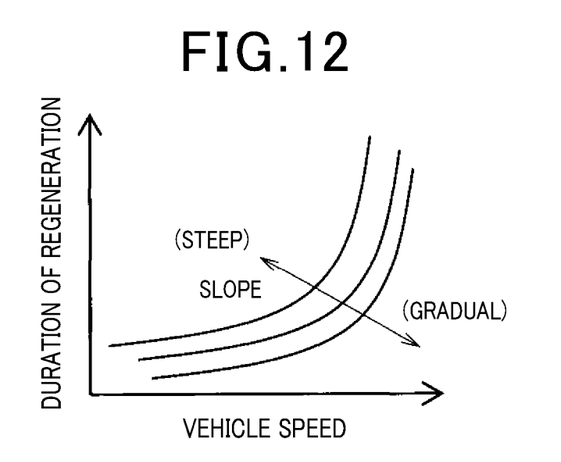
FIG. 12 is a map showing a relationship between vehicle speed, slope, and regeneration duration.

Next, based on the vehicle speed and the slope, the regeneration duration is calculated (S162B). Specifically, the vehicle speed and the degree of slope are applied to the map shown in FIG. 12, to calculate the regeneration duration. With the map of FIG. 12, the higher the vehicle speed, the longer becomes the regeneration duration, and the steeper the slope, the longer becomes the regeneration duration.

Next, a decision is made as to whether the regeneration duration is longer than a prescribed value (corresponding to a threshold value) (S163B). If the regeneration duration is judged to be longer than the prescribed value (S163B: YES) then the upper limit value of the regeneration command is calculated with priority being assigned to achieving high efficiency of output from the rotary electric machine 12 (S164B). Specifically, in the same way as for the third embodiment, coefficients α, β, γ are set such that the efficiency that will be attained for inputting and outputting electric power between the rotary electric machine 12 and the battery 10 will become maximized after a prescribed time.

On the other hand, If the regeneration duration is judged not to be longer than the prescribed value (S163B: NO) then the upper limit value of the regeneration command is calculated with priority being assigned to achieving a high output from the rotary electric machine 12 (S165B). Specifically, in the same way as for the second embodiment, the coefficients α, β, γ are set such as to maximize the integrated value of electric power that will be inputted and outputted between the rotary electric machine 12 and the battery 10 for a prescribed duration. Based on the calculated allowable generated power [W], the upper limit value of power generation torque is then calculated, as the upper limit value of the power generation command. The processing of S161B~S165B corresponds to processing executed as an upper limit value setting section.

If the duration for which the inputting and outputting electric power between of the rotary electric machine 12 and the battery 10 continues is short, then since the amount of temperature increase of the respective sections will be small, it is effective to make the output from the rotary electric machine 12 high. On the other hand, if the duration of inputting and outputting electric power between of the rotary electric machine 12 and the battery 10 is long, then it is effective to continue the output from the rotary electric machine 12 for the long duration in a condition in which the output efficiency is high.

With this embodiment, if the predicted duration of output from the rotary electric machine 12 is shorter than a threshold value, then the upper limit value of the output is set by giving priority to a high output, while if the predicted duration of output is longer than the threshold value, then the upper limit value of the output is set by giving priority to high output efficiency. For that reason, the output upper limit value for the rotary electric machine 12 can be appropriately set in accordance with the duration for which inputting and outputting electric power between the rotary electric machine 12 and the battery 10 is continued.

The following modifications may be made to the above embodiments.

Figure 13:
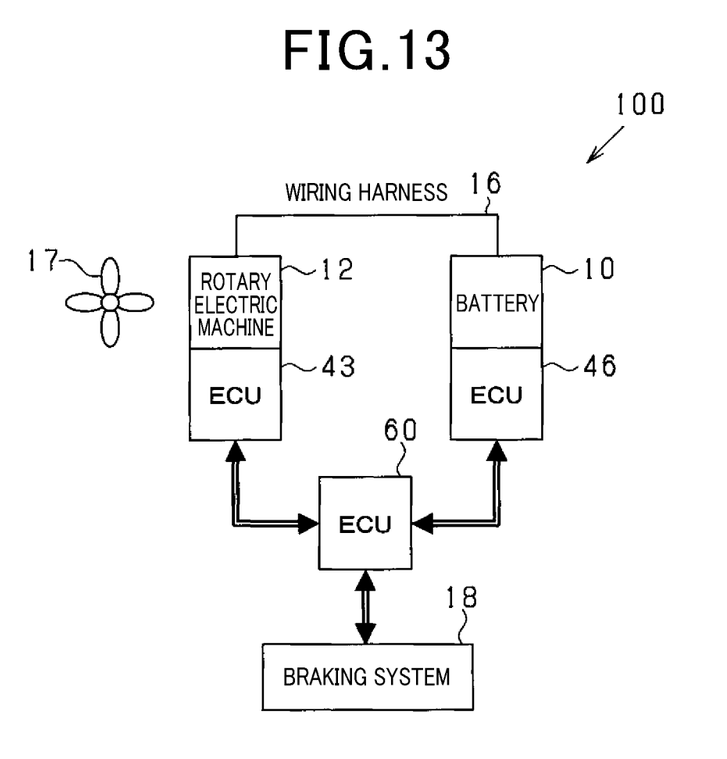
FIG. 13 is a is a general diagram showing a modified example of an in-vehicle system.

As shown in FIG. 13, the in-vehicle system 100 is equipped with a fan 17 for cooling the 12, and it would be equally possible to for the control section 43 to control the operation of the fan 17 (corresponding to a cooling control section). The ECU 60 (corresponding to a cooling input section) would receive from the control section 43, as input, the state of the cooling control). The ECU 60 could then set the output upper limit value based also on the inputted state of the cooling control. With such a configuration, the output upper limit value can be set while taking into consideration the state of the cooling control, and hence the effective output from the rotary electric machine 12 could be further increased. It should be noted that such cooling control is not necessarily limited in application to the rotary electric machine 12, but could equally be executed for the battery 10 or the wiring harness 16. The coolant temperature, etc., could be taken into consideration, as the state of the cooling control.

Furthermore, it would be equally possible for the ECU 60 to transmit commands for increasing the cooling control output to the control section 43, if the upper limit values of output for the respective objects are set such as to exceed the allowable output values of these objects. With such a configuration, if there is a danger of excessive temperature increase for the respective objects, the temperature increase can be suppressed by increasing the cooling control output.

As shown in FIG. 13, the in-vehicle system 100 is equipped with a braking system 18, and it would be equally possible for the ECU 60 (corresponding to a braking input section) to receive braking requests from the braking system 18. Braking requests are requests for braking torque to be generated by the rotary electric machine 12. The ECU 60 could then, when a braking request is received, forcibly set the output upper limit value as a braking request-use output upper limit value. With such a configuration, if there is a need for braking torque to be generated by the rotary electric machine 12 for the safety of the vehicle, then the output upper limit value from the rotary electric machine 12 could be set such as to give priority to that need.

Alternatively, it would be possible for the ECU 60 to calculate a short term-use output upper limit value and a long term-use output upper limit value, as upper limit values of output, and to forcibly set the short term-use upper limit value as the output upper limit value when a braking request is inputted. Since the amount of temperature increase of the respectively sections will only be small, in such a case of short-term output from the rotary electric machine 12, the short term-use output upper limit value can be made higher than the long term-use output upper limit value. Furthermore, an interval during which braking requests 18 inputted will continue only until the vehicle speed becomes reduced, and so will comparatively short. Hence, the short term-use output upper limit value can be forcibly set as the output upper limit value from the rotary electric machine 12 when a braking request is inputted. In that way, when it is necessary for braking torque to be generated for the safety of the vehicle, priority is given to that requirement, in setting the output upper limit value from the rotary electric machine 12.

Figure 14:
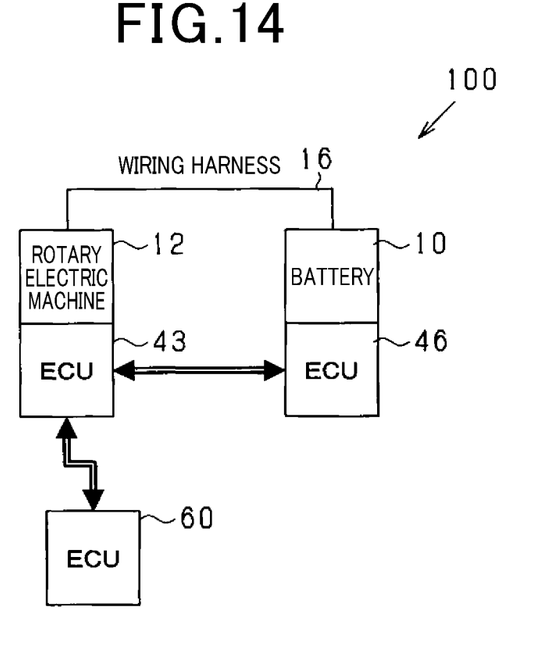
FIG. 14 is a general diagram showing another modified example of an in-vehicle system.

With the above embodiments, the allowable value calculation section and the transmitting section are provided with a control section 43 which controls the rotary electric machine 12, however it would be equally possible to provide a battery ECU 46 (corresponding to a battery control section) for controlling the battery 10. With such a configuration, respective functions of the above-described allowable value calculation section and transmitting section could be implemented by the battery ECU 46. Alternatively, it would be equally possible for the allowable value calculation section and the transmitting section to be provided in the control section 43 or in the battery ECU. In that case, when necessary information is received by the control section 43 or the battery ECU from the ECU 60, this would be done without executing processing for performing unnecessary communication, so that the responsiveness of control could be enhanced. As shown in FIG. 14, for example when it is necessary for the ECU 60 and the battery ECU 46 to transmit/receive necessary information, the control section 43 could serve as a relay. Similarly, the battery ECU 46 could serve as a relay.

Furthermore the invention is not limited to maximizing the efficiency of inputting and outputting of electric power in accordance with the condition of the rotary electric machine 12 or the battery 10, such that the efficiency reaches a maximum after a prescribed time, and kinetic energy could be more effectively utilized even if the efficiency is only made higher than the efficiency at the current time point after a prescribed time, during regeneration by the rotary electric machine 12. In that respect, it would be equally possible for the control section 43 to calculate the efficiency of inputting and outputting electric power between power between the rotary electric machine 12 and the battery 10 after a prescribed time, and to correct the allowable values such as to increase that efficiency beyond the efficiency at the current time point. With such a configuration, not only can the effective output from the rotary electric machine 12 be increased, but also energy can be effectively utilized. Furthermore, the allowable values could be corrected such as to make the output from the battery 10 become higher after a prescribed time than at the current time point.

Similarly, it would be equally possible to set the output upper limit value from the battery 10 such as to make the output from the battery 10 higher after a prescribed time than at the current time point.

Although the present disclosure has been described in accordance with embodiments, it is to be understood that the disclosure is not limited to these embodiments and structures. The present disclosure encompasses various modified forms and changes that are within an equivalent scope. Furthermore, various combinations and forms, and other combinations and forms that include one or more elements, also come within the scope and range of concepts of the present disclosure.

What is claimed is:

1. A control apparatus for controlling a rotary electric machine, applied to a system which includes the rotary electric machine, wiring, a battery that is connected to the rotary electric machine by the wiring, and an upper limit value setting section which sets an output upper limit value that is an upper limit of an output command of the rotary electric machine, the control apparatus for controlling the rotary electric machine comprising:
  a temperature acquisition section which acquires a temperature of at least one of the battery and the wiring;
  an allowable output value calculation section which calculates, based on the temperature that is acquired by the temperature acquisition section, an allowable output value that is an upper limit allowed for the output command of the rotary electric machine; and,
a transmitting section which transmits the allowable output value calculated by the allowable value calculation section to the upper limit value setting section;
wherein
when the temperature acquired by the temperature acquisition section is lower than a prescribed temperature, the allowable value calculation section calculates a value for the allowable output value that is greater than a prescribed allowable value, and
the temperature acquisition section includes:
a current acquisition section which acquires a current flowing in the wiring; and
a temperature estimation section which estimates a temperature of the wiring based on the current acquired by the current acquisition section and on a resistance of the wiring.

2. The control apparatus for the rotary electric machine according to claim 1, wherein
the allowable value setting section calculates the allowable output value for the rotary electric machine based further upon a duration for which electric power is inputted and outputted between the rotary electric machine and the battery.

3. The control apparatus for the rotary electric machine according to claim 1, wherein
the temperature estimation section includes a voltage drop acquisition section which acquires a voltage drop of the wiring, and
the temperature estimation section calculates the resistance of the wiring based on the current that is acquired by the current acquisition section and on the voltage drop that is acquired by the voltage drop acquisition section.

4. The control apparatus for the rotary electric machine according to claim 1, wherein
the allowable value calculation section predicts a future temperature value of the temperature of the wiring acquired by the temperature acquisition section, and corrects the allowable output value based on the predicted future value.

5. The control apparatus for the rotary electric machine according to claim 4, wherein
the allowable value calculation section corrects a parameter that predicts the future temperature value, with the correction being based on the predicted future value and on the temperature value that is acquired by the temperature acquisition section.

6. The control apparatus for the rotary electric machine according to claim 4, wherein
the allowable value calculation section calculates the allowable output value such as to make the future temperature value become lower than a target temperature.

7. The control apparatus for the rotary electric machine according to claim 1, wherein
the allowable output value calculation section comprises a deterioration condition acquisition section which acquires a condition of deterioration of an object for which the temperature is acquired, and
the allowable output value calculation section corrects the allowable output value based on the condition of deterioration that is acquired by the deterioration condition acquisition section.

8. A control apparatus for controlling a rotary electric machine, applied to a system which includes the rotary electric machine, wiring, a battery that is connected to the rotary electric machine by the wiring, and an upper limit value setting section which sets an output upper limit value that is an upper limit of an output command of the rotary electric machine, the control apparatus for controlling the rotary electric machine comprising:
a temperature acquisition section which acquires a temperature of at least one of the battery and the wiring;
an allowable output value calculation section which calculates, based on the temperature that is acquired by the temperature acquisition section, an allowable output value that is an upper limit allowed for the output command of the rotary electric machine; and,
a transmitting section which transmits the allowable output value calculated by the allowable value calculation section to the upper limit value setting section; wherein
when the temperature acquired by the temperature acquisition section is lower than a prescribed temperature, the allowable value calculation section calculates a value for the allowable output value that is greater than a prescribed allowable value, and
the prescribed allowable value is a value that is set for causing the temperature of the battery to increase quickly.

9. The control apparatus for the rotary electric machine according to claim 1, wherein
the allowable value calculation section calculates the efficiency that will be attained for inputting and outputting electric power between the rotary electric machine and the battery after a prescribed time, and corrects the allowable output value such as to maximize the efficiency.

10. A control apparatus for controlling a rotary electric machine, applied to a system which comprises the rotary electric machine, wiring, a battery that is connected to the rotary electric machine by the wiring, and an upper limit value setting section which sets an output upper limit value that is an upper limit of an output command of the rotary electric machine, the control apparatus for controlling the rotary electric machine comprising:
a temperature acquisition section which acquires a temperature of at least one of the battery and the wiring;
an allowable output value calculation section which calculates, based on the temperature that is acquired by the temperature acquisition section, an allowable output value that is an upper limit allowed for the output command of the rotary electric machine; and
a transmitting section which transmits the allowable output value calculated by the allowable value calculation section to the upper limit value setting section; wherein
the allowable value calculation section calculates the efficiency that will be attained for inputting and outputting electric power between the rotary electric machine and the battery after a prescribed time, and calculates the allowable output value such as to maximize the efficiency.

* * * * *